United States Patent
Khurana et al.

(10) Patent No.: US 12,505,495 B2
(45) Date of Patent: Dec. 23, 2025

(54) USING MODERATION BY PROXY TO IDENTIFY ABUSE IN AUDIO STREAMS

(71) Applicant: Roblox Corporation, San Mateo, CA (US)

(72) Inventors: Shyna Khurana, San Francisco, CA (US); Sophie Finck, San Mateo, CA (US); Eliza Jacobs, San Mateo, CA (US); Alex Trimm, San Mateo, CA (US); Effie Goenawan, San Francisco, CA (US); Brandon Kang, San Mateo, CA (US); Alexey Goloshubin, San Mateo, CA (US); Yiming Hu, San Mateo, CA (US); Hitesh Chhabra, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 177 days.

(21) Appl. No.: 18/236,899

(22) Filed: Aug. 22, 2023

(65) Prior Publication Data
US 2025/0069157 A1   Feb. 27, 2025

(51) Int. Cl.
*G06Q 50/00*  (2024.01)
*G10L 15/08*  (2006.01)
(Continued)

(52) U.S. Cl.
CPC ............. *G06Q 50/01* (2013.01); *G10L 15/08* (2013.01); *G10L 21/043* (2013.01); *H04L 63/306* (2013.01); *G10L 15/22* (2013.01)

(58) Field of Classification Search
CPC ..................................................... G06Q 50/01
See application file for complete search history.

(56) References Cited

U.S. PATENT DOCUMENTS

2009/0177979 A1*  7/2009  Garbow .................... G06F 3/00
715/757
2013/0151609 A1*  6/2013  Rubinstein ............. G06Q 10/10
709/204

(Continued)

OTHER PUBLICATIONS

"Gtaonline", https://web.archive.org/web/20230531235858/https://www.reddit.com/r/gtaonline/comments/28rurd/psa_level_too_high_and_youll_get_banned_open/, dated May 31, 2023 (Year: 2023).*

(Continued)

*Primary Examiner* — Rupangini Singh
(74) *Attorney, Agent, or Firm* — IP Spring

(57) ABSTRACT

A metaverse application generates a first abuse score for the audio stream associated with a first user based on rules that analyze user signals, wherein the user signals include one or more selected from the group of one or more second users muting the first user, a history of past moderation actions associated with the first user, one or more third users blocking the first user, and combinations thereof. The metaverse application includes an audio-classifier model that obtains a second abuse score for an audio stream associated with the first user, wherein the audio stream is provided as input to the audio-classifier model. The metaverse application determines that the first user is committing abuse based on one or more selected from the group of the first abuse score, the second abuse score, and combinations thereof exceeding a threshold score value. Responsive to determining that the first user is committing abuse, the metaverse application performs a remedial action.

19 Claims, 6 Drawing Sheets

(51) Int. Cl.
    *G10L 15/22*     (2006.01)
    *G10L 21/043*     (2013.01)
    *H04L 9/40*     (2022.01)

(56) References Cited

U.S. PATENT DOCUMENTS

| | | | | |
|---|---|---|---|---|
| 2020/0364727 | A1* | 11/2020 | Scott-Green | G06Q 50/01 |
| 2021/0370188 | A1* | 12/2021 | Thomas | A63F 13/355 |
| 2021/0402304 | A1* | 12/2021 | Dorn | A63F 13/493 |
| 2022/0284884 | A1* | 9/2022 | Tongya | G06F 40/242 |
| 2023/0353606 | A1* | 11/2023 | DiPaulo | G10L 15/08 |
| 2024/0017177 | A1* | 1/2024 | Bartolome | A63F 13/79 |
| 2024/0342614 | A1* | 10/2024 | Gonen | A63F 13/75 |

OTHER PUBLICATIONS

C_Croaxer, "How man bans until a payer gets banned roblox", https://web.archive.org/web/20220707190617/hhttps://devforum.roblox.com/t/how-many-bans-until-a-player-gets-banned-on-roblox/1771626/2, dated Jul. 7, 2022 (Year: 2022).*

JediOfArgonath, https://web.archive.org/web/20230327224850/https://forums.theshow.com/topic/25467/got-baited-then-suspended-for-30-days-be-careful-boys, dated Mar. 27, 2023 (Year: 2023).*

"Roblox Support", https://web.archive.org/web/20220817015737/https://en.help.roblox.com/hc/en-us/articles/203313120-Safety-Features-Chat-Privacy-Filtering, Aug. 17, 2022 (Year: 2022).*

Dollychun, "Blocky—Rules for public servers and private servers", dated Oct. 4, 2020 (hereinafter "Dollychun"), https://devforum.roblox.com/t/blocky-rules-for-public-servers-and-private-servers/805147 (Year: 2020).*

* cited by examiner

600

Generate a first abuse score for an audio stream associated with a first user based on rules that analyze user signals, where the user signals include one or more selected from the group of one or more second users muting the first user, a history of past punishments, the one or more third users blocking the first user, and combinations thereof 602

Obtain, with an audio-classifier model, a second abuse score for the audio stream associated with the first user, where the audio stream is provided as input to the audio-classifier model 604

Determine that the first user is committing abuse based on at least one selected from the group of the first abuse score, the second abuse score, and combinations thereof exceeding a threshold score value 606

Responsive to determining that the first user is committing abuse, perform a remedial action 608

FIG 6

USING MODERATION BY PROXY TO IDENTIFY ABUSE IN AUDIO STREAMS

BACKGROUND

Abuse in a virtual environment occurs in multiple ways. For example, avatars may wear offensive outfits, players may perform offensive actions, players may say offensive things, and players may type offensive words into a group chat. Moderating audio in real-time communications is difficult because of the volume of audio that moderators would have to review in a short time period. The longer the delay between a violation and a consequence, the more likely that a player will continue to commit abuse in the virtual environment.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Embodiments relate generally to a method to perform moderation of an audio stream in a virtual experience. According to one aspect, a method includes generating a first abuse score for an audio stream associated with a first user in a virtual environment based on rules that analyze user signals, wherein the user signals include one or more selected from the group of one or more second users muting the first user, a history of past moderation actions associated with the first user, one or more third users blocking the first user, and combinations thereof. The method further includes obtaining, with an audio-classifier model, a second abuse score for an audio stream associated with the first user, wherein the audio stream is provided as input to the audio-classifier model. The method further includes determining that the first user is committing abuse based on one or more selected from the group of the first abuse score, the second abuse score, and combinations thereof exceeding a threshold score value. The method further includes responsive to determining that the first user is committing abuse, performing a remedial action.

In some embodiments, the first abuse score is generated responsive to receiving an abuse report that identifies the audio stream as including abusive content. In some embodiments, the remedial action includes: responsive to the first user not experiencing a previous remedial action, instituting a first temporary ban of the first user in the virtual environment, responsive to the first user experiencing the previous remedial action, determining whether the previous remedial action was the first temporary ban, responsive to the previous remedial action being the first temporary ban, instituting a second temporary ban, wherein the second temporary ban is for a duration longer than a duration of the first temporary ban, and responsive to the previous remedial action being the second temporary ban, instituting a permanent ban. In some embodiments, the method further includes prior to performing the remedial action, determining that the one or more second users muted the first user or receiving, from the audio-classifier model, a recommendation to warn the first user and providing the warning to the first user that the user is violating community standards.

In some embodiments, the method further includes responsive to performing the remedial action, providing the audio stream that is alleged to include abusive content to a moderator and responsive to the moderator determining that the audio stream does not include abusive content, modifying the rules that are used to generate the first abuse score. In some embodiments, providing the audio stream to the moderator includes increasing a default playback speed as compared to an original recording speed for the audio stream and providing a transcript of the audio stream.

In some embodiments, the user signals further include a first age of the first user, one or more second ages of the one or more second users, and the rules are different depending on one or more selected from the group of the first age, the one or more second ages, and combinations thereof. In some embodiments, the user signals further include whether the audio stream is public or private and the threshold score value is higher if the audio stream is private than if the audio stream is public. In some embodiments, the user signals further include an experience level of the first user and the threshold score value. In some embodiments, the method further includes obtaining, with the audio-classifier model a severity of abuse and a confidence associated with the severity of abuse and prior to performing the remedial action, determining a type of warning to provide to the first user based on the severity of abuse and the confidence associated with the severity of abuse.

According to one aspect, a system includes a processor and a memory coupled to the processor, with instructions stored thereon that, when executed by the processor, cause the processor to perform operations comprising: generating a first abuse score for an audio stream associated with a first user in a virtual environment based on rules that analyze user signals, wherein the user signals include one or more selected from the group of one or more second users muting the first user, a history of past moderation actions associated with the first user, one or more third users blocking the first user, and combinations thereof; obtaining, with an audio-classifier model, a second abuse score for the audio stream associated with the first user, wherein the audio stream is provided as input to the audio-classifier model; determining that the first user is committing abuse based on one or more selected from the group of the first abuse score, the second abuse score, and combinations thereof exceeding a threshold score value; and responsive to determining that the first user is committing abuse, performing a remedial action.

In some embodiments, the first abuse score is generated responsive to receiving an abuse report that identifies the audio stream as including abusive content. In some embodiments, the remedial action includes: responsive to the first user not experiencing a previous remedial action, instituting a first temporary ban of the first user in the virtual environment; responsive to the first user experiencing the previous remedial action, determining whether the previous remedial action was the first temporary ban; responsive to the previous remedial action being the first temporary ban, instituting a second temporary ban, wherein the second temporary ban is for a duration longer than a duration of the first temporary ban; and responsive to the previous remedial action being the second temporary ban, instituting a permanent ban. In some embodiments, the operations further include providing the first user with an explanation of the abuse that resulted in the remedial action. In some embodiments, the operations further include responsive to performing the remedial action, providing the audio stream that is alleged to include abusive content to a moderator and responsive to the moderator determining that the audio stream does not include abusive content, modifying the rules that are used to generate the first abuse score.

According to one aspect, non-transitory computer-readable medium with instructions that, when executed by one or more processors at a user device, cause the one or more processors to perform operations, the operations comprising: generating a first abuse score for an audio stream associated with a first user in a virtual environment based on rules that analyze user signals, wherein the user signals include one or more selected from the group of one or more second users muting the first user, a history of past moderation actions associated with the first user, one or more third users blocking the first user, and combinations thereof; obtaining, with an audio-classifier model, a second abuse score for the audio stream associated with the first user, wherein the audio stream is provided as input to the audio-classifier model; determining that the first user is committing abuse based on one or more selected from the group of the first abuse score, the second abuse score, and combinations thereof exceeding a threshold score value; and responsive to determining that the first user is committing abuse, performing a remedial action.

In some embodiments, the first abuse score is generated responsive to receiving an abuse report that identifies the audio stream as including abusive content. In some embodiments, the remedial action includes: responsive to the first user not experiencing a previous remedial action, instituting a first temporary ban of the first user in the virtual environment; responsive to the first user experiencing the previous remedial action, determining whether the previous remedial action was the first temporary ban; responsive to the previous remedial action being the first temporary ban, instituting a second temporary ban, wherein the second temporary ban is for a duration longer than a duration of the first temporary ban; and responsive to the previous remedial action being the second temporary ban, instituting a permanent ban. In some embodiments, the operations further include providing the first user with an explanation of the abuse that resulted in the remedial action. In some embodiments, the operations further include responsive to performing the remedial action, providing the audio stream that is alleged to include abusive content to a moderator and responsive to the moderator determining that the audio stream does not include abusive content, modifying the rules that are used to generate the first abuse score.

BRIEF DESCRIPTION OF THE DRAWINGS

FIG. 6 a flow diagram of an example method to determine if a first user is committing abuse in an audio chat, according to some embodiments described herein.

DETAILED DESCRIPTION

When users interact during a virtual experience, a first user may commit several types of abuse. Abuse in a voice chat was previously difficult to detect in real-time because of the inherent delay present in waiting for a moderator to review the audio stream and make a determination about whether the audio stream included abuse.

The application advantageously describes a metaverse application that uses two different method to determine whether a user has committed abuse in an audio stream of a virtual experience. The first method includes analyzing user signals that include the reactions of other users in a virtual experience to generate a first abuse score. The second method includes using an audio-classifier model that is trained to output a second abuse score based on the audio stream.

The metaverse application determines whether the first user committed abuse based on the first abuse score and/or the second abuse score. If the first abuse score and/or the second abuse score exceed a threshold score value, the metaverse application performs a remedial action, such as implementing a temporary ban on the voice chat. The metaverse application may also provide an explanation as to why the remedial action occurred in order to reduce future instances of abuse.

Example Network Environment 100

Figure 1:
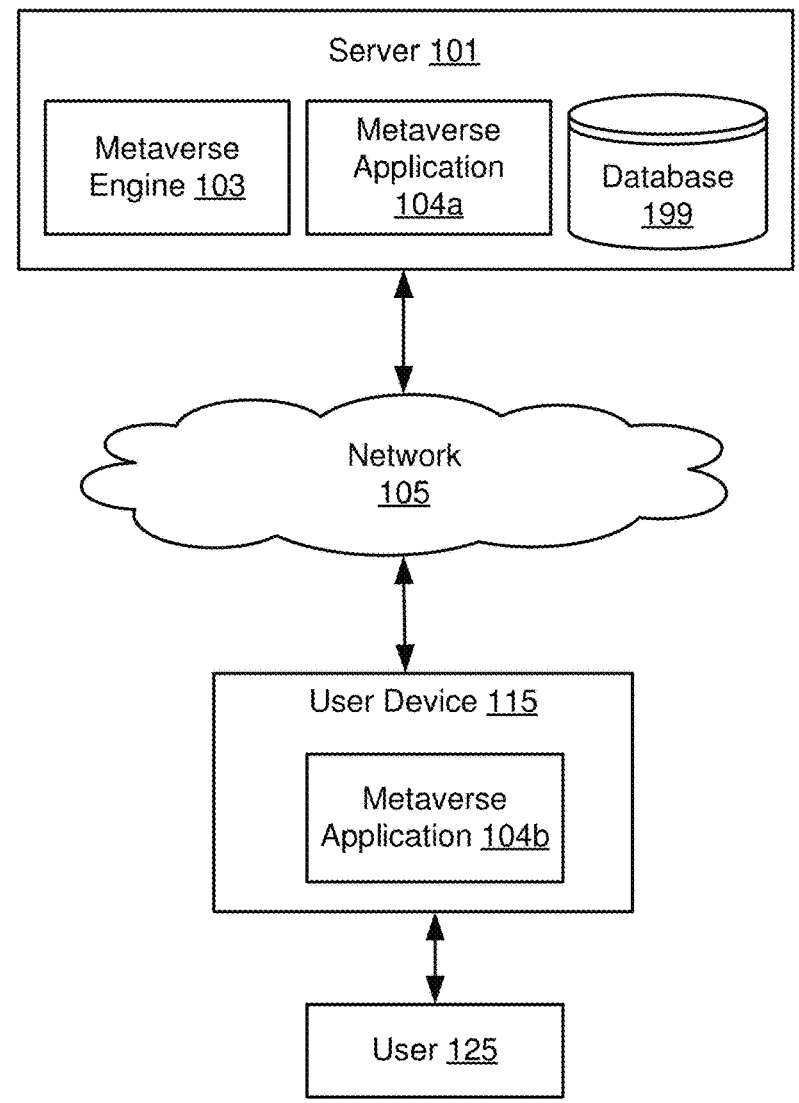
FIG. 1 is a block diagram of an example network environment, according to some embodiments described herein.

FIG. 1 illustrates a block diagram of an example environment 100. In some embodiments, the environment 100 includes a server 101 and user device 115, coupled via a network 105. User 125 may be associated with the user device 115. In some embodiments, the environment 100 may include other servers or devices not shown in FIG. 1. For example, the server 101 may include multiple servers 101 and the user device 115 may include multiple user devices 115a, n. In FIG. 1 and the remaining figures, a letter after a reference number, e.g., "115a," represents a reference to the element having that particular reference number. A reference number in the text without a following letter, e.g., "115," represents a general reference to embodiments of the element bearing that reference number.

The server 101 includes one or more servers that each include a processor, a memory, and network communication hardware. In some embodiments, the server 101 is a hardware server. The server 101 is communicatively coupled to the network 105. In some embodiments, the server 101 sends and receives data to and from the user devices 115. The server 101 may include a metaverse engine 103, a metaverse application 104a, and a database 199.

In some embodiments, the metaverse engine 103 includes code and routines operable to generate and provide a metaverse, such as a three-dimensional (3D) virtual environment. The virtual environment may include one or more virtual experiences in which one or more users can participate. A user may select an avatar that wears any type of outfit, perform various actions, and participate in gameplay or other type of interaction with other users. Further, a user associated with an avatar may communicate with other users in the virtual experience via text chat, voice chat, video (or simulated video) chat, etc.

Virtual experiences may be hosted by a platform that provides the virtual environment. Virtual experiences in the metaverse/virtual environment may be user-generated, e.g., by creator users that design and implement virtual spaces within which avatars can move and interact. Virtual experiences may have any type of objects, including analogs of real-world objects (e.g., trees, cars, roads, etc.) as well as virtual-only objects.

The virtual environment may support different types of users with different demographic characteristics (age, gender, location, etc.). For example, users may be grouped into groups such as users 13 or below, users between 14-16 years old, users between 17-18 years old, adult users, etc. The virtual environment platform may benefit from providing a suitable and safe experience to different users. For this purpose, the virtual environment platform may implement automated, semi-automated, and/or manual techniques to provide platform safety. Such techniques may include detection of abuse, including abusive/offensive behavior (e.g., gestures or actions performed by an avatar); abusive communication (e.g., via text, voice, or video chat); inappropriate objects (e.g., avatars wearing clothing with inappropriate words or symbols; objects of inappropriate shapes and/or motion); etc.

In some embodiments, the metaverse application 104a includes code and routines operable to receive user input from a user device 115 during gameplay of a virtual experience. The metaverse application 104a generates a first abuse score for the audio stream associated with a first user based on rules that analyze user signals, wherein the user signals include one or more signals selected from the group of one or more second users muting the first user, a history of past moderation actions, the one or more second users blocking the first user, and combinations thereof. The metaverse application 104a obtains with an audio-classifier model, a second abuse score for an audio stream associated with the first user, wherein the audio stream is provided as input to the audio-classifier model. The metaverse application 104a determines that the first user is committing abuse based on one or more selected from the group of the first abuse score, the second abuse score, and combinations thereof exceeding a threshold score value. Responsive to determining that the first user is committing abuse, the metaverse application 104a performs a remedial action.

In some embodiments, the metaverse engine 103 and/or the metaverse application 104a are implemented using hardware including a central processing unit (CPU), a field-programmable gate array (FPGA), an application-specific integrated circuit (ASIC), any other type of processor, or a combination thereof. In some embodiments, the metaverse engine 103 is implemented using a combination of hardware and software.

The database 199 may be a non-transitory computer readable memory (e.g., random access memory), a cache, a drive (e.g., a hard drive), a flash drive, a database system, or another type of component or device capable of storing data. The database 199 may also include multiple storage components (e.g., multiple drives or multiple databases) that may also span multiple computing devices (e.g., multiple server computers). The database 199 may store data associated with the virtual experience hosted by the metaverse engine 103, such as a current game state, user profiles, etc.

The user device 115 may be a computing device that includes a memory and a hardware processor. For example, the user device 115 may include a mobile device, a tablet computer, a desktop computer, a mobile telephone, a wearable device, a head-mounted display, a mobile email device, a portable game player, a portable music player, a game console, an augmented reality device, a virtual reality device, a reader device, or another electronic device capable of accessing a network 105.

The user device 115 includes metaverse application 104b. In some embodiments, the metaverse application 104b performs the same or similar steps to the ones described above with reference to the metaverse application 104a stored on the server 101.

In the illustrated embodiment, the entities of the environment 100 are communicatively coupled via a network 105.

The network 105 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof. Although FIG. 1 illustrates a single network 105 coupled to the server 101 and the user device 115, in practice one or more networks 105 may be coupled to these entities.

Example Computing Device 200

Figure 2:
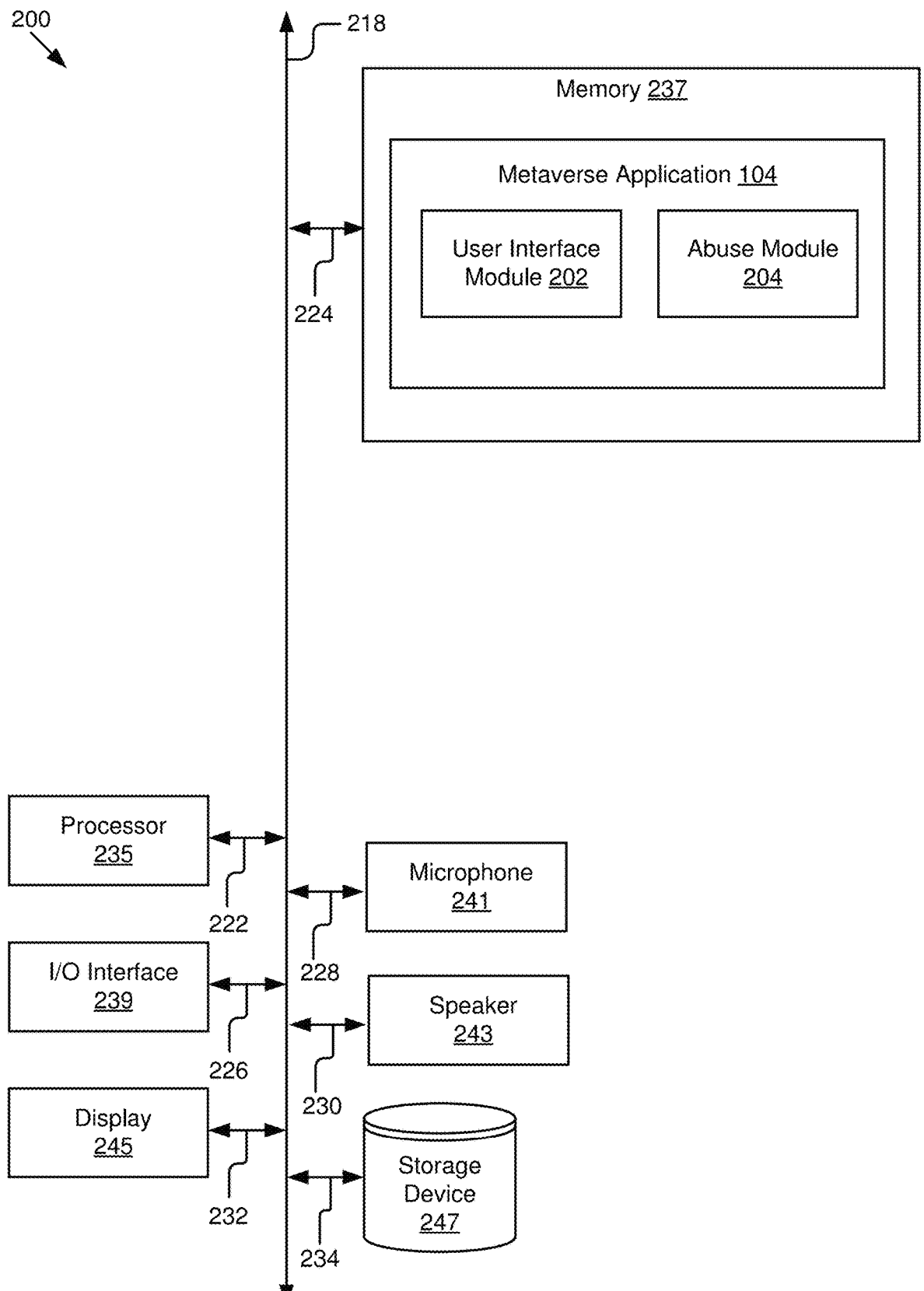
FIG. 2 is a block diagram of an example computing device, according to some embodiments described herein.

FIG. 2 is a block diagram of an example computing device 200 that may be used to implement one or more features described herein. Computing device 200 can be any suitable computer system, server, or other electronic or hardware device. In some embodiments, the computing device 200 is the user device 115. In some embodiments, the computing device 200 is the server 101.

In some embodiments, computing device 200 includes a processor 235, a memory 237, an Input/Output (I/O) interface 239, a microphone 241, a speaker 243, a display 245, and a storage device 247, all coupled via a bus 218. In some embodiments, the computing device 200 includes additional components not illustrated in FIG. 2. In some embodiments, the computing device 200 includes fewer components than are illustrated in FIG. 2. For example, in instances where the metaverse application 104 is stored on the server 101 in FIG. 1, the computing device may not include a microphone 241, a speaker 243, or a display 245.

The processor 235 may be coupled to a bus 218 via signal line 222, the memory 237 may be coupled to the bus 218 via signal line 224, the I/O interface 239 may be coupled to the bus 218 via signal line 226, the microphone 241 may be coupled to the bus 218 via signal line 228, the speaker 243 may be coupled to the bus 218 via signal line 230, the display 245 may be coupled to the bus 218 via signal line 232, and the storage device 247 may be coupled to the bus 218 via signal line 234.

The processor 235 includes an arithmetic logic unit, a microprocessor, a general-purpose controller, or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. In some implementations, the processor 235 may include special-purpose units, e.g., machine learning processor, audio/video encoding and decoding processor, etc. Although FIG. 2 illustrates a single processor 235, multiple processors 235 may be included. In different embodiments, processor 235 may be a single-core processor or a multicore processor. Other processors (e.g., graphics processing units), operating systems, sensors, displays, and/or physical configurations may be part of the computing device 200, such as a keyboard, mouse, etc.

The memory 237 stores instructions that may be executed by the processor 235 and/or data. The instructions may include code and/or routines for performing the techniques described herein. The memory 237 may be a dynamic random access memory (DRAM) device, a static RAM, or some other memory device. In some embodiments, the memory 237 also includes a non-volatile memory, such as a static random access memory (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the metaverse application 104, which is described in greater detail below.

I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or storage device 247), and input/output devices can communicate via I/O interface 239. In another example, the I/O interface 239 can receive data from the server 101 and deliver the data to the metaverse application 104 and components of the metaverse application 104, such as the user interface module 202. In some embodiments, the I/O interface 239 can connect to interface devices such as input devices (keyboard, pointing device, touchscreen, microphone 241, sensors, etc.) and/or output devices (display 245, speaker 243, etc.).

Some examples of interfaced devices that can connect to I/O interface 239 can include a display 245 that can be used to display content, e.g., images, video, and/or a user interface of the metaverse as described herein, and to receive touch (or gesture) input from a user. Display 245 can include any suitable display device such as a liquid crystal display (LCD), light emitting diode (LED), or plasma display screen, cathode ray tube (CRT), television, monitor, touchscreen, three-dimensional display screen, a projector (e.g., a 3D projector), or other visual display device.

The microphone 241 includes hardware, e.g., one or more microphones that detect audio spoken by a person. The microphone 241 may transmit the audio to the metaverse application 104 via the I/O interface 239.

The speaker 243 includes hardware for generating audio for playback. In some embodiments, the speaker 243 may include audio hardware that supports playback via an external, separate speaker (e.g., wired or wireless headphones, external speakers, or other audio playback device) that is coupled to the computing device 200.

The storage device 247 stores data related to the metaverse application 104. For example, the storage device 247 may store a user profile associated with a user 125, a list of blocked avatars, etc.

Example Metaverse Application 104

FIG. 2 illustrates a computing device 200 that executes an example metaverse application 104 that includes a user interface module 202 and an abuse module 204. In some embodiments, a single computing device 200 includes all the components illustrated in FIG. 2. In some embodiments, one or more of the components may be on different computing devices 200. For example, the user device 115 may include the user interface module 202, while the abuse module 204 is implemented on the server 101. In some embodiments, different portions of one or more of modules 202 and 204 may be implemented on the user device 115 and on the server 101.

The user interface module 202 generates graphical data for displaying a user interface for users associated with user devices to participate in a virtual experience. In some embodiments, before a user participates in the virtual experience, the user interface module 202 generates a user interface that includes information about how the user's information may be collected, stored, and/or analyzed. For example, the user interface requires the user to provide permission to use any information associated with the user. The user is informed that the user information may be deleted by the user, and the user may have the option to choose what types of information are provided for different uses. The use of the information is in accordance with applicable regulations and the data is stored securely. Data collection is not performed in certain locations and for certain user categories (e.g., based on age or other demographics), the data collection is temporary (i.e., the data is discarded after a period of time), and the data is not shared with third parties. Some of the data may be anonymized, aggregated across users, or otherwise modified so that specific user identity cannot be determined.

The user interface module 202 receives user input from a user during gameplay of a virtual experience. For example, the user input may cause an avatar to move around, perform actions, change poses, speak to other users, etc. in the virtual experience. The user interface module 202 generates graphical data for displaying the location, actions, poses, etc. of the avatar within the virtual experience.

The user may interact with other users in the virtual experience. Some of these interactions may be negative and, in some embodiments, the user interface module 202 generates graphical data for a user interface that enables a user to limit exposure to other users that the user wants to avoid. For example, the user interface module 202 may include an option to mute other users, block other users, and to report abuse that occurs in the virtual experience. For example, another avatar may be wearing an objectionable piece of clothing, an avatar may be holding an inappropriate object (e.g., a flag associated with a hate group, an object in the shape of something offensive, etc.), an avatar may perform an offensive action (e.g., the avatar may use spray paint to draw an image of genitals), or an avatar may utter an inappropriate phrase (e.g., either in a chat box or directly via voice chat to the user). One avatar may also be associated with multiple types of abuse, such as wearing inappropriate clothing while performing an offensive act.

Figure 3:
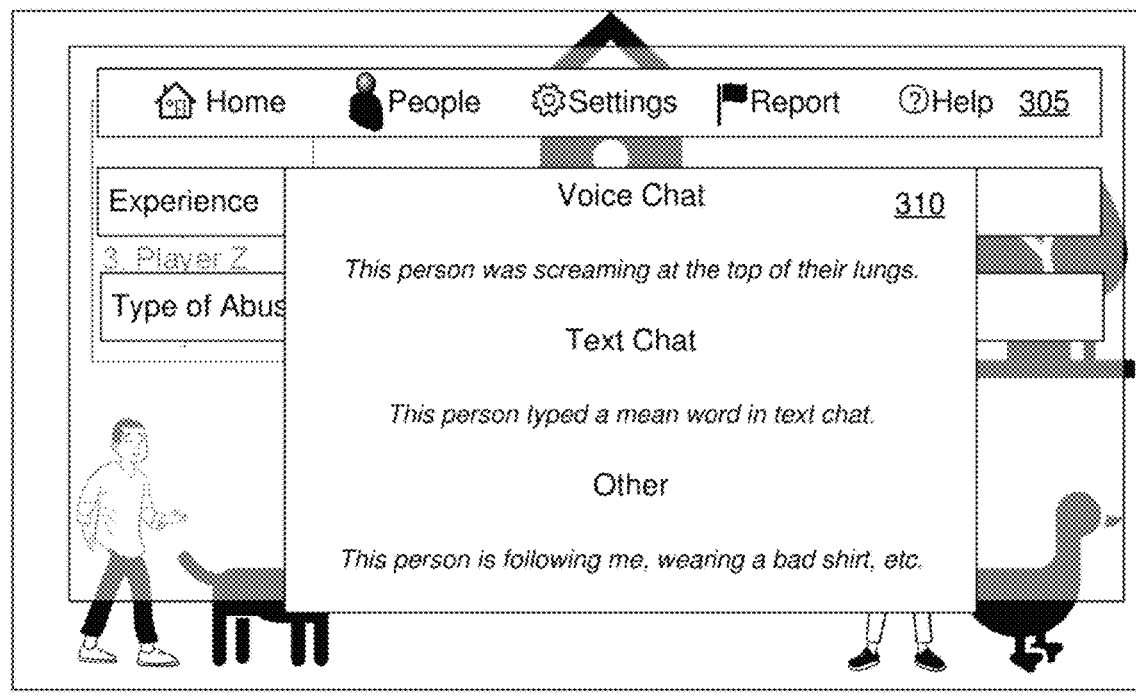
FIG. 3 is an example user interface to report abusive behavior in a virtual experience, according to some embodiments described herein.

FIG. 3 is an example user interface 300 to report abusive behavior in a virtual experience. The user interface 300 includes a menu 305 for navigating to home, people, settings, report, or help. In this example, the user selected the report option to report abuse. The user interface 300 includes options 310 for reporting abuse from voice chat, text chat, or other abusive behavior with examples of the types of behavior that would qualify for each type of abuse. The user may select the italicized text to provide their own examples of abuse that they have encountered. In some embodiments, the user interface module 202 provides an abuse report to the abuse module 204 with an audio stream that includes the alleged abuse.

The abuse module 204 receives user signals associated with a first user that are analyzed by the abuse module 204. The user signals may include information about when a second user mutes the first user, a history of past moderation actions, information about when a second user blocks the first user, a history of user-filed abuse reports, a history of one or more second users unfriending and/or unfollowing the first user, an age of the first user, a level of experience of the first user, whether the audio stream is public or private, etc. In some embodiments, the abuse module 204 may analyze instances where the first user was muted by other users that are tied to a user-filed abuse report, blocks that occurred on the day that an abuse report is filed, and the history of past moderation actions associated with the user for the last 28 days (e.g., warnings, temporary bans, etc.).

Figure 4:
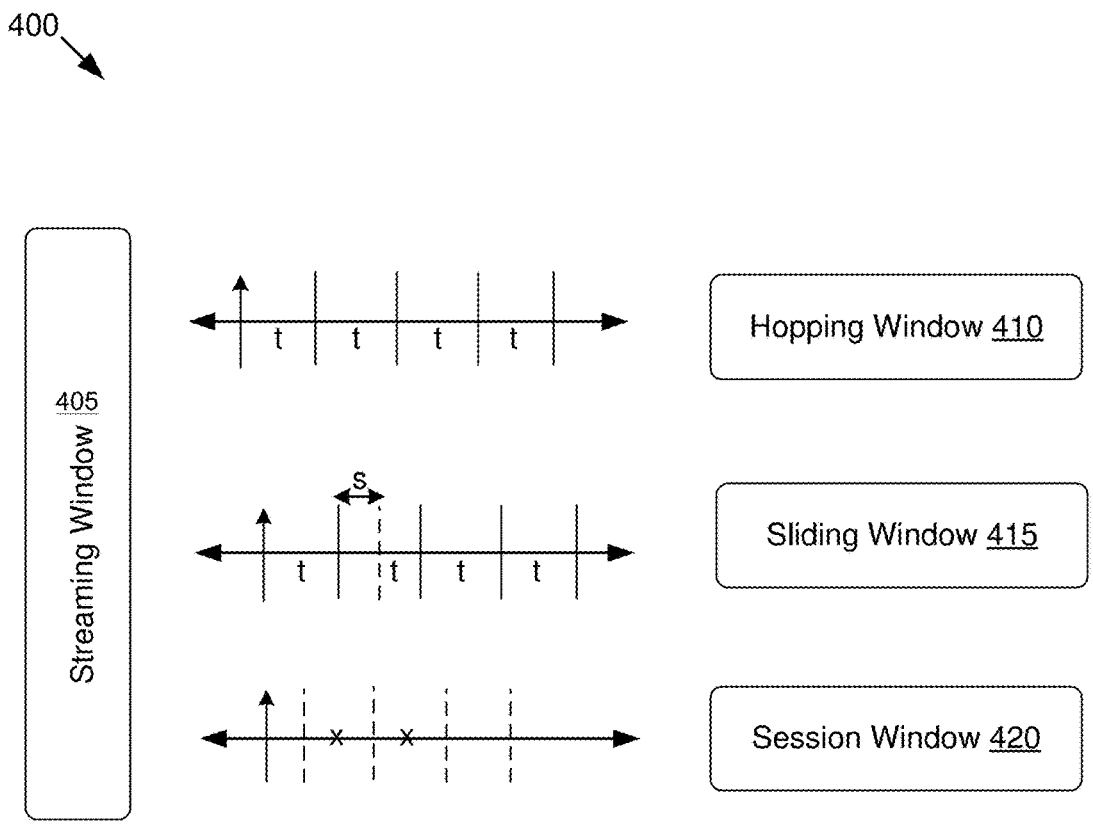
FIG. 4 is an example graphic of different ways to determine a streaming window, according to some embodiments described herein.

The abuse module 204 generates a first abuse score based on rules that analyze the user signals. In some embodiments, the abuse module 204 determines the first abuse score based on a particular window of time, called a streaming window, during which the user signals are aggregated. The streaming window may be defined in multiple ways. For example, FIG. 4 illustrates a hopping window, a sliding window, and a session window. In some embodiments, the abuse module 204 uses one or more of the three windows to analyze user signals for generating the first abuse score. Other windows are also possible, such as a tumbling window or a snapshot window.

FIG. 4 is an example graphic 400 of different ways to determine a streaming window. In FIG. 4, the streaming window 405 may be defined three ways: as a hopping window 410, a sliding window 415, and a session window 420.

The hopping window 410 defines a specific timeframe over which the abuse module 204 computes the first abuse score based on the user signals. The hopping window 410 restarts once the time window "t" is over. An example of a hopping window with size 10 is [0, 10] [10, 20], etc.

A sliding window 415 has two components: a time window "t" and a sliding window size "s". The sliding window describes a lookback period. When a new event occurs, it can belong to several windows, and each window can be computed separately. An example of a sliding window with time 10 and a sliding window with size 5 is [0, 10] [5, 15] [10, 20].

A session window 420 is defined by a timeout and a maximum duration. The abuse module 204 receives signals for events during the time period and a timeout occurs between a first event and a last event, only the first event counts. If the time between the first event and the last event is less than the timeout, the abuse module 204 continues to receive signals until it reaches the maximum duration. An example of a session window 420 with timeout 10 is:
 a. event 1 timestamp 5, session window is [start: 5, update: null, timeout: 15].
 b. event 2 timestamp 7, session window is [start: 5, update 7, timeout: 17].
  i. event 3 timestamp 18, the session window is closed because 18>17. Session window is closed [start: 5, update: 7, timeout: 17]. Event 3 is in a new session window [start: 18, update: null, timeout: 28].
  ii. event 3 is a session end event with timestamp 12, session window is closed [start: 5, update: 7, timeout: 12].

In some embodiments, the abuse module 204 may determine a remedial action to take against the first user if the first user score exceeds a threshold score value. For example, the abuse module 204 may assign values to each instance during a predetermined time period when a second user mutes the first user and may assign values to each instance during the predetermined time period when a second user blocks the first user. The abuse module 204 may also use the details associated with a past punishment and a past abuse report to determine if the thresholds for determining that the first user committed other abuse violations (e.g., chat violations, instructed an avatar to perform abuse in the virtual experience, created obscene objects, etc.) were consistent with the thresholds currently being applied to the first user.

In some embodiments, the abuse module 204 applies different sets of rules based on the age of the first player. In some embodiments, the rules are different for the following groups: 13-16, 16-18, or over 18 years old. For example, if a first user is 18 or over, the consequences for the first user committing abuse may escalate faster than if the first user was a minor. In some embodiments, the abuse module 204 applies different sets of rules based on the age of other players. For example, the abuse module 204 may use a lower threshold score value if the first user is speaking in an area where minors can hear the first user speak.

In some embodiments, the abuse module 204 applies different rules depending on whether the audio stream is public or private. For example, where two users are engaged in a private audio chat, the threshold score value may be higher than if anyone is able to listen to the audio stream.

In some embodiments, the abuse module 204 applies different rules depending on the experience level of the first user. For example, if the first user has only been engaging with the virtual experience for less than a month (a week, a day, etc.), the abuse module 204 may issue one or more warnings before imposing temporary bans or the threshold score value may be higher than if the first user has more than a month of experience.

In some embodiments, the abuse module 204 generates the first abuse score responsive to receiving an abuse report from a second user that identifies an audio stream as including abusive content. Using the abuse report as a trigger to determine whether the first user has committed abuse advantageously avoids the need to ask a moderator to review the audio stream, which can be prohibitively time consuming. Studies have shown that when users receive feedback soon after the abuse is committed, the users are more likely to reduce instances of abuse in the future as compared to instances where there is a longer delay (e.g., 24-48 hours) between when the instance of abuse occurred and when the remedial action is implemented.

The abuse module 204 receives the request to report abuse. In some embodiments, the abuse module 204 transmits the audio stream that was identified in the abuse report to a moderator that reviews the audio and makes a determination of whether abuse occurred. In some embodiments, the abuse module 204 transmits an audio stream with a default playback speed that is faster as compared to an original recording speed for the audio stream and a transcript of the audio stream.

In some embodiments, the abuse module 204 determined that instances of abuse in audio streams are frequent and uniformly distributed, thereby obviating the need for longer audio streams and reducing a review time for the moderator. For example, the abuse module 204 may use the transcript of the audio stream to identify instances of abuse. As a result, the abuse module 204 generates an audio stream that is less than 10 minutes for the moderator to review.

If the moderator determines that the audio stream included abuse when the abuse module 204 determined that the first user did not commit abuse, or vice versa—that the audio stream did not include abuse when the abuse module 204 determined that the first user did commit abuse, the abuse module 204 may modify the rules that are used to generate the first abuse score. For example, the abuse module 204 may change the weight associated with each user signal, modify the threshold score value, etc. In some embodiments, the audio stream and associated determination from the moderator are used as training data for the audio-classifier model as discussed below in greater detail.

In some embodiments, the abuse module 204 includes an audio-classifier model that generates an abuse score for an audio stream associated with a first user. In some embodiments, the audio-classifier model also outputs a recommendation to warn a user before a remedial action is imposed. The audio-classifier model may be used instead of the rules or in addition to the rules (e.g., the abuse module 204 may generate a first abuse score using rules and the audio-classifier model may output a second abuse score). In some embodiments, the audio-classifier model may also output a recommendation to warn the user of a violation of community standards before a remedial action is imposed.

In some embodiments, the audio-classifier model receives a continual audio stream as input or the audio-classifier model receives a particular segment of an audio stream, such as a segment of an audio stream that is associated with an abuse report. In some embodiments, both the rules and the audio-classifier model are iteratively applied to the audio stream, where each iteration corresponds to a respective portion of the audio stream, such as every ten seconds, 30 seconds, minute, etc. In some embodiments, the abuse score is associated with a timestamp so that the abuse score is aligned with a position in the audio stream. In some embodiments, the audio-classifier model transcribes the audio stream and identifies words and phrases that are considered abusive in the audio stream.

In some embodiments, the audio-classifier model is a machine-learning model that is trained with a training set. The training set may include examples of audio streams with manual labels for abuse and examples of audio streams that include manual labels for non-abuse. As a result, the abuse module 204 trains the audio-classifier model to classify input audio streams as including abuse or not including abuse, using the distinctions between abusive audio streams and non-abusive audio streams during a supervised learning process. In some embodiments, the labels are divided by types of abuse, such as bullying, racism, and sexism/dating. In some embodiments, the labels are divided by severity of the abuse, such as low (e.g., profanity), medium (e.g., harassment), and high (e.g., self-harm).

In some embodiments, the training data also includes user signals, such as a history of one or more second users muting a first user, a history of past punishment, a history of one or more third users blocking a first user, and/or a history of abuse reports submitted for the first user.

In some embodiments, training data used for the audio-classifier model includes audio streams collected with user permission for training purposes and labeled by human reviewers (e.g., moderators). For example, the human reviewers listen to audio streams in the training data and identify whether each audio stream includes abuse and if so, timestamps locations within the audio stream where the abuse occurs. The human-generated data is referred to as ground truth labels. Such training data is then used to train the audio-classifier model, e.g., the audio-classifier model under training generates labels for each audio stream in the training data which is compared to the ground truth labels and a feedback function based on the comparison is used to update one or more model parameters.

In some embodiments, the audio-classifier model is a deep neural network. Types of deep neural networks include convolutional neural networks, deep belief networks, stacked autoencoders, generative adversarial networks, variational autoencoders, flow models, recurrent neural networks, and attention bases models. A deep neural network uses multiple layers to progressively extract higher-level features from the raw input where the input to the layers are different types of features extracted from other modules and the outputs are a determination of whether the audio stream includes abuse or not.

The abuse module 204 may generate layers that identify increasingly more detailed features and patterns within the speech for the audio stream where the output of one layer serves as input to a subsequently more detailed layer until a final output is an audio score associated with the audio stream. One example of different layers in the deep neural network may include token embeddings, segment embeddings, and positional embeddings.

In some embodiments, the abuse module 204 trains the machine-learning model using a backpropagation algorithm. A backpropagation algorithm modifies internal weights of input signals (e.g., at each node/layer of a multi-layer neural network) based on feedback which may be a function of output labels (e.g., "this portion of the audio stream has an abuse score of 5") produced by the model under training with ground truth labels included in the training data (e.g., "this portion of the audio stream has an abuse score of 11"). Such adjustment of weights can improve the accuracy of the model under training.

Once the abuse module 204 trains the audio-classifier model, the audio-classifier model receives an audio stream as input and obtains a second abuse score. In some embodiments, the audio-classifier model outputs one or more of a second abuse score, a category of abuse, a severity of abuse, and a confidence in the previous outputs (e.g., a confidence in the severity of the abuse). The category of abuse may include bullying, racism, and/or sexism/dating. For example, an audio stream may include multiple categories of abuse. The severity of the abuse may be categorized as low, medium, and high.

In some embodiments, the abuse module 204 may provide a warning to the first user responsive to certain user signals, such as when the first user is muted by two or more second users within the last 24 hours or based on obtaining a recommendation from the audio-classifier model.

The abuse module 204 may provide a series of warnings responsive to the user signals. For example, within a particular time window, such as a two-hour time window, the abuse module 204 may provide up to four warnings with at least a one-minute cool down period between warnings. In some embodiments, the abuse module 204 may instruct the user interface module 202 to generate a first type of warning that takes up a small portion of the screen for the first two instances and a second type of warning that takes up a large part of the screen and requires an affirmative response from the first user for the third and fourth instances.

In some embodiments, the type of warning may be determined based on the severity of the abuse and the confidence of the severity of the abuse as determined by the audio-classifier model. In some embodiments, the type of warning gets more severe as the user receives more warnings in a particular time period (e.g., past two hours). For example, a low severity, any level of confidence, and less than three warnings during the time period may result in a first type of warning that is a flag at the top of the screen that disappear after a short amount of time. A medium severity, a high confidence, and three or more warnings result in a warning that obscures the screen, while requiring the first user to acknowledge that they reviewed the warning (e.g., as described below with reference to FIG. 5A). A high severity, a high confidence, and five or more warnings result in a warning that takes up nearly all of the screen while requiring the user to acknowledge that they reviewed the warning and select a continue button In some embodiments, the abuse module 204 may provide the warning to the first user the first time that the abuse module 204 determines that the user is committing abuse before imposing a remedial action.

Figure 5B:
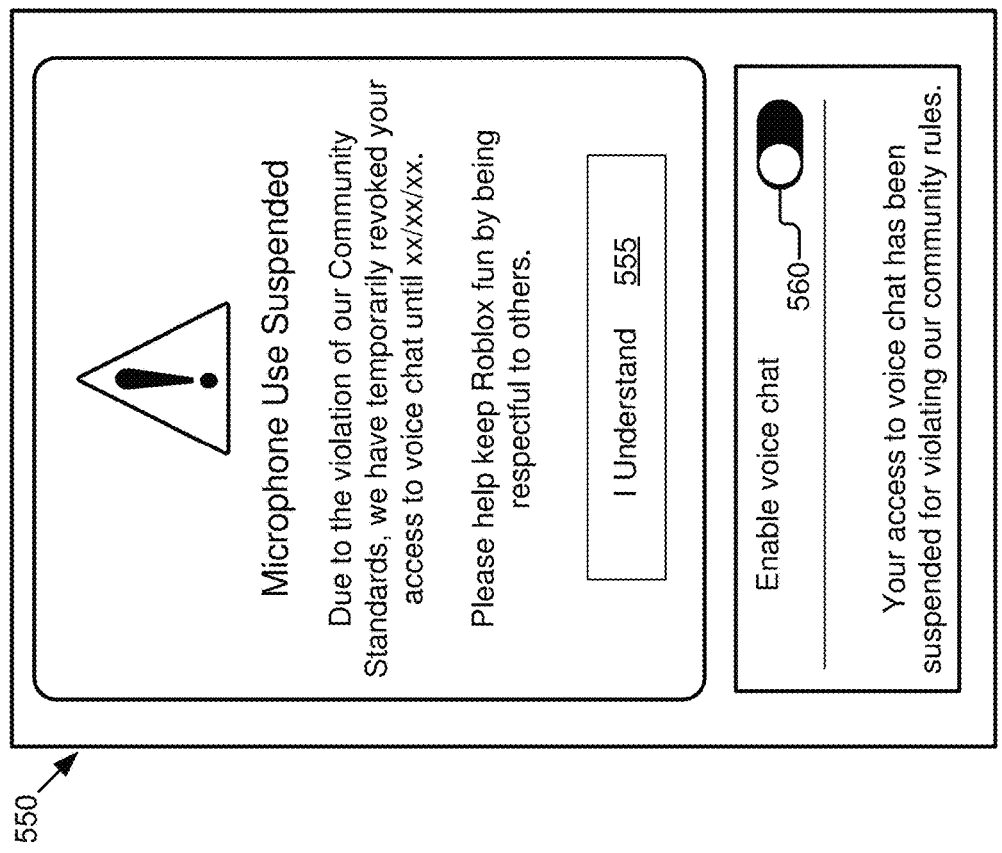
FIG. 5B includes an example user interface that describes the details of a remedial action, according to some embodiments described herein.
Figure 5A:
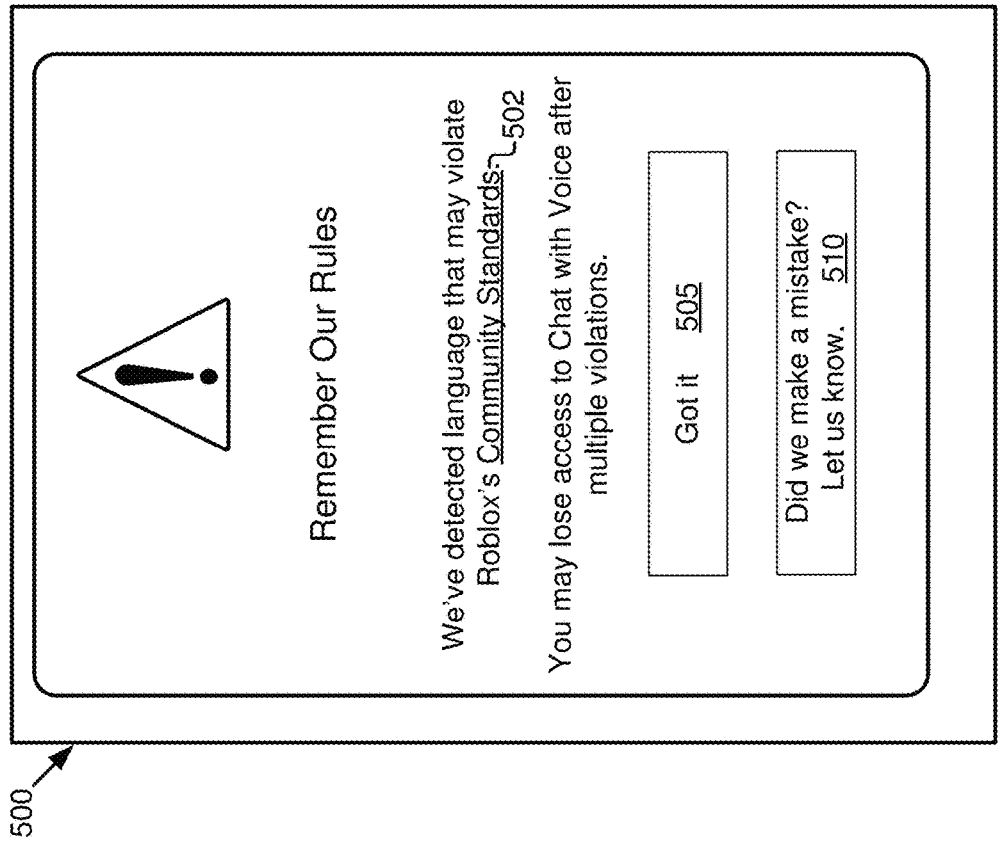
FIG. 5A includes an example user interface that warns the user that their language may result in a remedial action, according to some embodiments described herein.

FIG. 5A includes an example user interface 500 that warns the first user that their language may result in a remedial action. In this example, the user interface 500 includes a general warning that the first user has used language that violates community standards and a link 502 to the community standards. Clicking on the link 502 may take the user to a different page with all the community standards.

The user interface 500 also includes an agreement button 505 indicating that the first user acknowledges the warning. In some embodiments, the user interface includes a list of example words that the first user spoke (not shown) that are in violation of the community standards. If the first user disagrees with the warning, the first user may click on the disagreement button 510 with the text "Did we make a mistake? Let us know." In some embodiments, the abuse module 204 tracks the percentage of time the first user selects the acknowledgement button 505 versus the disagreement button 510.

In some embodiments, the abuse module 204 provides a warning before determining that the first user receives a remedial action. In some embodiments, the abuse module 204 determines that the user is committing abuse that warrants a remedial action based on the first abuse score and/or the second abuse score. The abuse module 204 may determine that the first user is committing abuse based on the first abuse score and/or the second abuse score exceeding a threshold score value. For example, the abuse module 204 may determine that the first user is committing abuse if either the first abuse score or the second abuse score exceed the threshold score value. In another example, the abuse module 204 may determine that the first user is committing abuse if both the first abuse score and the second abuse score exceed the threshold score value. In some embodiments, the first abuse score and the second abuse score use different scales and are associated with different threshold score values.

The remedial action may take several forms and be based on whether the first user is associated with previous remedial actions. In some embodiments, the abuse module 204 enacts a temporary ban for initial violations and permanent bans for more severe violations and/or repeat violations. The ban may be an audio ban that prevents the first user from accessing their audio, while still being allowed to participate in a virtual experience, or a player ban that prevents the first user from engaging with the virtual experience for a period of time. For example, the player ban may include disabling login credentials.

In some embodiments, the first time that a first user experiences a remedial action, the abuse module 204 may impose a first temporary ban (e.g., a one-day ban). The second time that the first user experiences a remedial action, the abuse module 204 may impose a second temporary ban, where the second temporary ban is longer than the first temporary ban (e.g., a three-day ban). The third time that the first user experiences a remedial action, the abuse module 204 may impose a permanent ban. In some embodiments, the permanent ban is permanent in that it the length of the ban is indeterminant, although the permanent ban may be lifted by the abuse module 204 based on other factors (e.g., responsive to the first user successfully appealing the permanent ban).

In some embodiments, after imposing a remedial action, the user interface module 202 generates graphical data for displaying a user interface that includes an explanation of the abuse that resulted in the remedial action. FIG. 5B includes an example user interface 550 that describes the details of a remedial action. In this example, the user interface 550 includes an explanation that the first user is banned from using audio chat until a certain date. The first user is asked to select a button 505 to acknowledge that the first user understands the explanation.

The abuse module 204 imposes the temporary ban for the predetermined amount of time. Once the temporary ban has expired, the first user may select the toggle button 510 to enable voice chat.

Example Method

FIG. 6 is a flow diagram of an example method to determine if a first user is committing abuse in an audio chat. In some embodiments, all or portions of the method 600 are performed by the metaverse application 104 stored on the user device 115 and/or the metaverse application 104 stored on the computing device 200 of FIG. 2.

The method may begin at block 602. At block 602 a first abuse score is generated for the audio stream associated with a first user based on rules that analyze user signals. The user signals may include one or more second users muting the first user in a virtual environment. The user signals may also include a history of past moderation actions associated with the first user. For example, a history of past moderation actions during the last 29 days may be considered user signals. The user signals may also include one or more third users blocking the first user. The user signals may further include a first age of the first user, one or more second ages of the one or more second users or third users, and the rules are different depending on one or more selected from the group of the first age, the one or more second ages, and combinations thereof. The user signals may further include an experience level of the first user and the threshold score value. Block 602 may be followed by block 604.

At block 604, an audio-classifier model obtains a second abuse score for the audio stream associated with the first user where the audio stream is provided as input to the audio-classifier model. The rules and the audio-classifier model may be iteratively applied to the audio stream and wherein each iteration corresponds to a respective portion of the audio stream. Block 604 may be followed by block 606.

At block 606, it is determined whether the first user is committing abuse based on at least one selected from the group of the group of the first abuse score, the second abuse score, and combinations thereof exceeding a threshold score value. The first abuse score may be generated responsive to receiving an abuse report that identifies the audio stream as including abusive content. Block 606 may be followed by block 608.

At block 608, responsive to determining that the first user is committing abuse, a remedial action is performed. The remedial actions may include responsive to the first user not experiencing a previous remedial action, instituting a first temporary ban (e.g., a one-day ban) of the first user in the virtual environment; responsive to the first user experiencing the previous remedial action, determining whether the previous remedial action was the first temporary ban; responsive to the previous remedial action being the first temporary ban, instituting a second temporary ban (e.g., a three-day ban), wherein a duration of the second temporary ban is longer than a duration of the first temporary ban; and responsive to the previous remedial action being the second temporary ban, instituting a permanent ban. In some embodiments, the first user is provided with an explanation of the abuse that resulted in the remedial action.

After the remedial action is performed, the audio stream that is alleged to include abusive content may be provided to a moderator. Providing the audio stream to the moderator may further include increasing a default playback speed as compared to an original recording speed for the audio stream and providing a transcript of the audio stream. If the moderator determines that the audio stream does not include abusive content, the rules that are used to generate the first abuse score may be modified.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various embodiments. In some embodiments, blocks and operations can be performed multiple times, in a different order, and/or at different times in the methods.

Various embodiments described herein include obtaining data from various sensors in a physical environment, analyzing such data, generating recommendations, and providing user interfaces. Data collection is performed only with specific user permission and in compliance with applicable regulations. The data are stored in compliance with applicable regulations, including anonymizing or otherwise modifying data to protect user privacy. Users are provided clear information about data collection, storage, and use, and are provided options to select the types of data that may be collected, stored, and utilized. Further, users control the devices where the data may be stored (e.g., user device only; client+server device; etc.) and where the data analysis is performed (e.g., user device only; client+server device; etc.). Data is utilized for the specific purposes as described herein. No data is shared with third parties without express user permission.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one embodiments of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMS, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method to reduce abuse in audio streams, the method comprising:
   generating a first abuse score for an audio stream associated with a first user in a virtual environment based on rules that analyze user signals, wherein the user signals include whether the audio stream is public or private and at least one signal selected from a group of one or more second users muting the first user, a history of past moderation actions associated with the first user, one or more third users blocking the first user, and combinations thereof;
   outputting, with an audio-classifier model, a second abuse score for the audio stream associated with the first user, wherein the audio stream is provided as input to the audio-classifier model and the audio-classifier model is a machine-learning model that is trained with a plurality of pairs of audio examples where a first audio example of each pair is labelled as abusive and a second audio example is labelled as non-abusive, wherein the first audio example of each pair that is labelled as abusive is associated with a label that is associated with a particular severity of abuse such that during training, the audio-classifier model is provided the particular severity of abuse for the first audio example of each pair, and further comprising:

obtaining, with the audio-classifier model a severity of abuse for the audio stream, wherein the audio-classifier model generates one or more labels for the audio stream and wherein the severity of abuse for the audio stream is based on the generated one or more labels;

determining that the first user is committing abuse based on the first abuse score, the second abuse score, and combinations thereof exceeding a threshold score value, wherein the threshold score value is higher if the audio stream is private than if the audio stream is public; and responsive to determining that the first user is committing abuse, performing a remedial action, wherein the remedial action comprises a temporary ban or a permanent ban for the first user to access the virtual environment, wherein prior to performing the remedial action, the method further comprises determining a type of warning to provide to the first user based on the severity of abuse for the audio stream.

2. The method of claim 1, wherein the first abuse score is generated responsive to receiving an abuse report that identifies the audio stream as including abusive content.

3. The method of claim 1, wherein performing the remedial action includes:

responsive to the first user not experiencing a previous remedial action, instituting a first temporary ban of the first user in the virtual environment;

responsive to the first user experiencing the previous remedial action, determining whether the previous remedial action was the first temporary ban;

responsive to the previous remedial action being the first temporary ban, instituting a second temporary ban, wherein the second temporary ban is for a duration longer than a duration of the first temporary ban; and responsive to the previous remedial action being the second temporary ban, instituting the permanent ban.

4. The method of claim 1, further comprising:

prior to performing the remedial action, determining that the one or more second users muted the first user; and providing the type of warning to the first user that the first user is violating community standards.

5. The method of claim 1, further comprising:

responsive to performing the remedial action, providing the audio stream that is alleged to include abusive content to a moderator; and responsive to the moderator determining that the audio stream does not include abusive content, modifying the rules that are used to generate the first abuse score.

6. The method of claim 5, wherein providing the audio stream to the moderator includes increasing a default playback speed as compared to an original recording speed for the audio stream and providing a transcript of the audio stream.

7. The method of claim 1, wherein the user signals further include a first age of the first user, one or more second ages of the one or more second users, and the rules are different depending on one or more selected from the group of the first age, the one or more second ages, and combinations thereof.

8. The method of claim 1, wherein the first abuse score is generated based on a window of time.

9. The method of claim 1, wherein the user signals further include an experience level of the first user and the threshold score value.

10. A system to reduce abuse in audio streams comprising:
a processor; and
a memory coupled to the processor, with instructions stored thereon that, when executed by the processor, cause the processor to perform operations comprising:

generating a first abuse score for an audio stream associated with a first user in a virtual environment based on rules that analyze user signals, wherein the user signals include at least one signal selected from a group of one or more second users muting the first user, a history of past moderation actions associated with the first user, one or more third users blocking the first user, and combinations thereof;

outputting, with an audio-classifier model, a second abuse score for the audio stream associated with the first user, wherein the audio stream is provided as input to the audio-classifier model and the audio-classifier model is a machine-learning model that is trained with a plurality of pairs of audio examples where a first audio example of each pair is labelled as abusive and a second audio example is labelled as non-abusive, wherein the first audio example of each pair that is labelled as abusive is associated with a label that is associated with a particular severity of abuse such that during training, the audio-classifier model is provided the particular severity of abuse for the first audio example of each pair, and further comprising:

obtaining, with the audio-classifier model a severity of abuse for the audio stream, wherein the audio-classifier model generates one or more labels for the audio stream and wherein the severity of abuse for the audio stream is based on the generated one or more labels;

determining that the first user is committing abuse based on the first abuse score, the second abuse score, and combinations thereof exceeding a threshold score value, wherein the threshold score value is higher if the audio stream is private than if the audio stream is public; and responsive to determining that the first user is committing abuse, performing a remedial action, wherein the remedial action comprises a temporary ban or a permanent ban for the first user to access the virtual environment, wherein prior to performing the remedial action, the operations further comprise determining a type of warning to provide to the first user based on the severity of abuse for the audio stream.

11. The system of claim 10, wherein the first abuse score is generated responsive to receiving an abuse report that identifies the audio stream as including abusive content.

12. The system of claim 10, wherein performing the remedial action includes:

responsive to the first user not experiencing a previous remedial action, instituting a first temporary ban of the first user in the virtual environment;

responsive to the first user experiencing the previous remedial action, determining whether the previous remedial action was the first temporary ban;

responsive to the previous remedial action being the first temporary ban, instituting a second temporary ban, wherein the second temporary ban is for a duration longer than a duration of the first temporary ban; and responsive to the previous remedial action being the second temporary ban, instituting the permanent ban.

13. The system of claim 10, wherein the operations further comprise:

providing the first user with an explanation of the abuse that resulted in the remedial action.

14. The system of claim 10, wherein the operations further comprise:

responsive to performing the remedial action, providing the audio stream that is alleged to include abusive content to a moderator; and responsive to the moderator determining that the audio stream does not include abusive content, modifying the rules that are used to generate the first abuse score.

15. A non-transitory computer-readable medium with instructions that, when executed by one or more processors at a user device, cause the one or more processors to perform operations to reduce abuse in audio streams, the operations comprising:

generating a first abuse score for an audio stream associated with a first user in a virtual environment based on rules that analyze user signals, wherein the user signals include whether the audio stream is public or private and at least one signal selected from a group of one or more second users muting the first user, a history of past moderation actions associated with the first user, one or more third users blocking the first user, and combinations thereof;

outputting, with an audio-classifier model, a second abuse score for the audio stream associated with the first user, wherein the audio stream is provided as input to the audio-classifier model and the audio-classifier model is a machine-learning model that is trained with a plurality of pairs of audio examples where a first audio example of each pair is labelled as abusive and a second audio example is labelled as non-abusive, wherein the first audio example of each pair that is labelled as abusive is associated with a label that is associated with a particular severity of abuse such that during training, the audio-classifier model is provided the particular severity of abuse for the first audio example of each pair, and further comprising:

obtaining, with the audio-classifier model a severity of abuse for the audio stream, wherein the audio-classifier model generates one or more labels for the audio stream and wherein the severity of abuse for the audio stream is based on the generated one or more labels;

determining that the first user is committing abuse based on the first abuse score, the second abuse score, and combinations thereof exceeding a threshold score value, wherein the threshold score value is higher if the audio stream is private than if the audio stream is public; and responsive to determining that the first user is committing abuse, performing a remedial action, wherein the remedial action comprises a temporary ban or a permanent ban for the first user to access the virtual environment, wherein prior to performing the remedial action, the operations further comprise determining a type of warning to provide to the first user based on the severity of abuse for the audio stream.

16. The non-transitory computer-readable medium of claim 15, wherein the first abuse score is generated responsive to receiving an abuse report that identifies the audio stream as including abusive content.

17. The non-transitory computer-readable medium of claim 15, wherein performing the remedial action includes:

responsive to the first user not experiencing a previous remedial action, instituting a first temporary ban of the first user in the virtual environment;

responsive to the first user experiencing the previous remedial action, determining whether the previous remedial action was the first temporary ban;

responsive to the previous remedial action being the first temporary ban, instituting a second temporary ban, wherein the second temporary ban is for a duration longer than a duration of the first temporary ban; and responsive to the previous remedial action being the second temporary ban, instituting the permanent ban.

18. The non-transitory computer-readable medium of claim 15, wherein the operations further comprise:

providing the first user with an explanation of the abuse that resulted in the remedial action.

19. The non-transitory computer-readable medium of claim 15, wherein the operations further comprise:

responsive to performing the remedial action, providing the audio stream that is alleged to include abusive content to a moderator; and responsive to the moderator determining that the audio stream does not include abusive content, modifying the rules that are used to generate the first abuse score.

* * * * *